United States Patent [19]

Lewis et al.

[11] Patent Number: 5,701,417
[45] Date of Patent: Dec. 23, 1997

[54] METHOD AND APPARATUS FOR PROVIDING INITIAL INSTRUCTIONS THROUGH A COMMUNICATIONS INTERFACE IN A MULTIPLE COMPUTER SYSTEM

[75] Inventors: Ian D. Lewis, Seattle; Preston A. Hauck, Redmond, both of Wash.

[73] Assignee: Microstar Laboratories, Redmond, Wash.

[21] Appl. No.: 676,167

[22] Filed: Mar. 27, 1991

[51] Int. Cl.[6] .................. G06F 1/24; G06F 15/16
[52] U.S. Cl. .......... 395/200.16; 395/309; 395/182.21; 395/200.01; 364/DIG. 1; 364/DIG. 2
[58] Field of Search ............... 395/800, 775, 395/750, 425, 400, 725, 275, 200, 325, 500, 575, 375, 550; 370/85.6; 364/DIG. 1, DIG. 2

[56] References Cited

U.S. PATENT DOCUMENTS

| | | | |
|---|---|---|---|
| 4,538,224 | 8/1985 | Peterson | 364/425 |
| 4,590,551 | 5/1986 | Mathews | 395/200 |
| 4,823,256 | 4/1989 | Bishop et al. | 395/575 |
| 4,885,770 | 12/1989 | Croll | 379/269 |
| 4,896,289 | 1/1990 | Svinicki et al. | 395/575 |
| 5,058,110 | 10/1991 | Beach et al. | 370/85.6 |
| 5,070,450 | 12/1991 | Holman, Jr. et al. | 395/750 |
| 5,187,792 | 2/1993 | Dayon et al. | 395/725 |

FOREIGN PATENT DOCUMENTS

| | | |
|---|---|---|
| A2-0-268-285 | 11/1987 | European Pat. Off. . |
| A1-0-338-089 | 10/1988 | European Pat. Off. . |

OTHER PUBLICATIONS

J. Cooke, Electronics and Wireless World Apr., 1988, vol. 94, No. 1626, pp.344–345.

Dictionary of Computers, Information Processing of File Communcations, 2nd Bohlion, J.M. Rosenberg, p. 97, John Wiley & Sons, 1987.

Primary Examiner—Daniel H. Pan
Attorney, Agent, or Firm—Seed and Berry LLP

[57] ABSTRACT

A system for providing initial instructions to a first computer from a second computer through a communications interface connected between the two computers. A decoder causes the first computer to address the communications interface when the first computer outputs an address corresponding to the expected address of its initial instructions after being reset by the second computer.

20 Claims, 9 Drawing Sheets

METHOD AND APPARATUS FOR PROVIDING INITIAL INSTRUCTIONS THROUGH A COMMUNICATIONS INTERFACE IN A MULTIPLE COMPUTER SYSTEM

FIELD OF THE INVENTION

This invention relates to computer systems using multiple computers interacting with each other, and more particularly to a method and apparatus for allowing one of the computers to provide initial instructions to another of the computers through a communications interface.

BACKGROUND ART

2.1 Introduction

A typical computer comprises a central processing unit ("CPU"), memory devices, and input/output devices, all connected to a channel, known as a bus, for local transmission of data, address, and control signals within the computer. The CPU reads from and writes to the memory devices and input/output devices, and executes instructions. The signals connected to the busses of a computer may be buffered or latched.

Each memory device in a computer typically comprises a number of locations for storage of data. Each location has a unique address and is capable of storing a specific number of bits of information. Each bit of information is either a zero or a one. The valid addresses in the memory of a computer typically comprise one or several blocks of sequential addresses.

Each input/output device in a computer typically comprises one or several locations. The action of an input/output device in response to a read or write cycle initiated by the CPU may depend on the location selected.

When a CPU reads from or writes to a memory device or an input/output device, the CPU places address and control signals on its bus. Some of the address and control signals are connected to an address decoding circuit. The address decoding circuit decodes the address and control signals and produces selection signals for the individual memory devices and input/output devices. Each memory device or input/output device has one or more addresses to which it responds. In some computers there are control signals distinguishing between memory devices and input/output devices; in this case the input/output devices are said to be "I/O mapped". Other computers lack control signals distinguishing between memory devices and input/output devices; in this case the input/output devices are said to be "memory mapped."

Address decoding circuits typically are made up of small numbers of integrated circuits. In a typical computer, one programmable logic device can provide the entire address decoding circuit. Some microprocessor integrated circuits include address decoding circuits.

In a typical computer, some of the address and control signals from the CPU are connected directly to the memory devices and to the input/output devices. When the address decoding circuit selects one of the memory devices or input/output devices, the selected device typically uses some of the address and control signals to further select one memory or input/output location. The device selected by the address decoding circuit then responds by placing data on the bus in a read cycle or by reading data from the bus in a write cycle.

The address decoding circuit is not required to assign a unique address to each device. A memory device or an input/output device may have the same response to several distinct addresses.

In a typical computer, the memory devices comprise both Read Only Memory ("ROM") and read-write Random Access Memory ("RAM"). Permanent instructions and data are stored in ROM, and temporary instructions and data are stored in RAM. Instructions and data stored in ROM are retained even when power is not provided. Instructions and data stored in RAM are retained only as long as power is supplied to the RAM, unless special backup circuits are provided.

A computer has a reset signal which may be generated internally or may be generated externally by a reset circuit. After the reset signal becomes inactive, a computer typically starts its operation by fetching instructions at a specific address. The address is determined by the design of the computer, and also may depend on inputs to the computer at the time the reset signal is active. For computers based on the Intel 80286 microprocessor, for example, the initial instructions are fetched from memory at hexadecimal address "0FFFF0H". Instructions are fetched from sequential locations in memory, unless instruction execution specifically directs the CPU to fetch instructions from non-sequential locations, as when a jump or call instruction is executed.

A typical computer is designed so that the locations from which the computer fetches its initial instructions are in ROM, as instructions in ROM are retained even when power is not supplied to the computer. Selection of ROM is effected through the address decoding circuit, which responds to the address from which the initial instructions are fetched by activating a select signal to ROM.

It is found to be advantageous in many applications to split up the computing requirements among several computers which communicate with each other. Often one computer is the main computer, and the other computers are dedicated to controlling special functions. One or more computers may be dedicated to time-critical tasks which can be serviced more reliably by dedicated computers than by general purpose computers.

2.2 Communications Interfaces

A communications interface is a circuit whose function is to transmit information between or among computers. The communications interface of a system which comprises more than one computer can be described by considering a typical system comprising two computers, called Computer A and Computer B, which are complete computers with independent busses. In the following description, Computer A communicates with Computer B through a communications interface.

A simple communications interface comprises two registers, Register 1 and Register 2, and associated control circuits. Computer A is able to write to Register 1 and to read from Register 2. Computer B is able to read from Register 1 and to write to Register 2. The control circuits provide signals to each computer indicating that the other computer has read from or written to one of the registers.

In a more complex communications interface, the registers are replaced by first-in-first-out ("FIFO") buffers. In this sort of communications interface, the control circuits typically signal availability of either data to be read or unused locations to which data can be written. The control circuits also may include registers for status information or for passing messages without using the FIFO buffers. In applications in which one or both of the computers communicating through a communications interface are performing time-critical tasks, it is common to use FIFO buffers because they provide isolation between the actions of the computers.

A communications interface may be implemented by providing a block of RAM to which two or more computers have access. To allow Computer A and Computer B to communicate, for example, a block of RAM in Computer B (possibly comprising all of the RAM in Computer B) can be provided with control bus, address bus, and data bus connections to both Computer A and Computer B. This block of RAM also can be provided with arbitration circuits allowing reliable access from either Computer A or Computer B. A RAM which provides two means of independent access, as described here, is called a dual-ported RAM.

When Computer A and Computer B attempt to gain access to the dual-ported RAM simultaneously, one computer is granted access to the RAM until it finishes its operations, and the other computer typically is required to wait. For time-critical applications, allowance must be made for the worst possible waiting requirements.

The communications interface between two computers may combine several types of communications interface. In a high performance system, for example, FIFO buffers may be used while time-critical operations are being performed, and dual-ported RAM may be used for communication when time-critical operations are not being performed. This discussion of communications interfaces is not exhaustive; it is meant only to suggest some of the possibilities for communications interfaces. Other communications interfaces may be implemented, for example, with direct memory access circuits or with serial communication circuits.

2.3 Prior Art For Providing Initial Instructions

In the prior art, the most common method of providing initial instructions to a computer is through the use of ROM. The initial instructions for a computer are located in ROM on the computer's bus. Upon reset, the computer fetches and executes instructions from the ROM.

In the prior art, another method of providing initial instructions to a computer is through the use of the use of dual-ported RAM. In a system comprising two computers, Computer A and Computer B, Computer A might fetch its initial instructions from ROM. After Computer A is operating, it can write the initial instructions for Computer B into dual-ported RAM and then provide a reset signal for Computer B. Computer B then can fetch its initial instructions from the dual-ported RAM.

In the prior art, another method for providing initial instructions is to include in a communications interface a means for copying instructions from the communications interface to RAM and a means for fetching the initial instructions from that RAM. Such capabilities are designed into certain integrated circuits for CPUs which commonly are used in systems with several CPUs. This method may be implemented as a variation of the more common ROM method described above, as the means for copying instructions from the communications interface to RAM may include means for fetching instructions from a ROM which is internal to an integrated circuit.

2.4 Disadvantages in the Prior Art

The methods of providing initial instructions known in the prior art are suitable for some applications, but have disadvantages which are overcome by the present invention. The disadvantages of the ROM method are:

(1) cost—The cost of ROM adds to the cost of a computer.
(2) space—The ROM requires space on a computer board.
(3) flexibility—When the initial instructions for a computer are located in ROM, each time the software is modified the ROM must be removed, reprogrammed and replaced. The procedure requires time and expense, and also increases the likelihood of introducing errors in the programming process or in the replacement process.

There are disadvantages to the dual-ported RAM method. Dual-ported RAM circuits are relatively complex, leading to:

(1) cost—The control circuits which provide dual-ported access to RAM usually are expensive.
(2) space—The control circuits which provide dual-ported access to RAM require space on a computer board.
(3) speed—The complexity added by the control circuits which provide dual-ported access to RAM may increase the instruction access time or require more expensive components for a given access time.
(4) power—The control circuits require power.

The third method described above is available only if it is included in the design of the integrated circuits for a CPU. Most standard microprocessors do not include the required circuits, so this method generally is not available.

DISCLOSURE OF THE INVENTION

It is an object of the invention to provide a system for supplying initial instructions to a computer that is relatively inexpensive and uses relatively few components thereby minimizing the use of circuit board space.

It is another object of the invention to provide a system for supplying initial instructions to a computer that can be implemented with a wide variety of components, thereby maximizing design flexibility.

It is another object of the invention to provide a system for supplying initial instructions to a computer that can be used with various additional components to enhance performance of the system.

It is still another object of the invention to provide a system for supplying initial instructions to a computer that allows software upgrades for the computer to be provided without requiring ROM or other hardware changes, thereby increasing the flexibility of the computer.

It is a further object of the invention to provide a system for supplying initial instructions to a computer that allows special programs for manufacturing tests and for debugging possibly defective computers to be loaded through the communications interface, thereby eliminating the need to change ROMs for tests and for debugging.

These and other objects of the invention are provided by a computer system having at least first and second computers which are connected to each other by a communications interface for allowing the computers to communicate with each other. Initial instructions for the first computer are stored in the second computer. These instructions are transferred to the first computer through the communications interface after the second computer resets the first computer. A decoder in the first computer causes the first computer to address the communications interface when said first computer outputs an address falling within the address space of its initial instructions.

The first computer preferably also includes a random access memory ("RAM") and means controlled by the first computer to transfer instructions from the communications interface to the RAM when the first computer is executing initial instructions from the communications interface. After instructions have been written into RAM, the first computer can then execute instructions from RAM. In the event that instructions are executed from RAM, the second computer may include a protection circuit for write protecting addresses in RAM where the instructions have been stored.

The second computer may include circuitry to determine when initial instructions for the first computer are not available at the output of the communications interface. The circuitry can then allow the second computer to prevent the first computer from attempting to execute instructions.

The first computer also may include a device for storing identifying data, such as a serial number, that can be read by the first computer or by the second computer.

The initial instructions for the first computer may be stored in a variety of media, including a data disk. Similarly, the communications interface may be implemented using a variety of techniques, including use of a FIFO buffer, a direct memory access controller, or a data register.

BEST MODE FOR CARRYING OUT THE INVENTION

Figure 1:
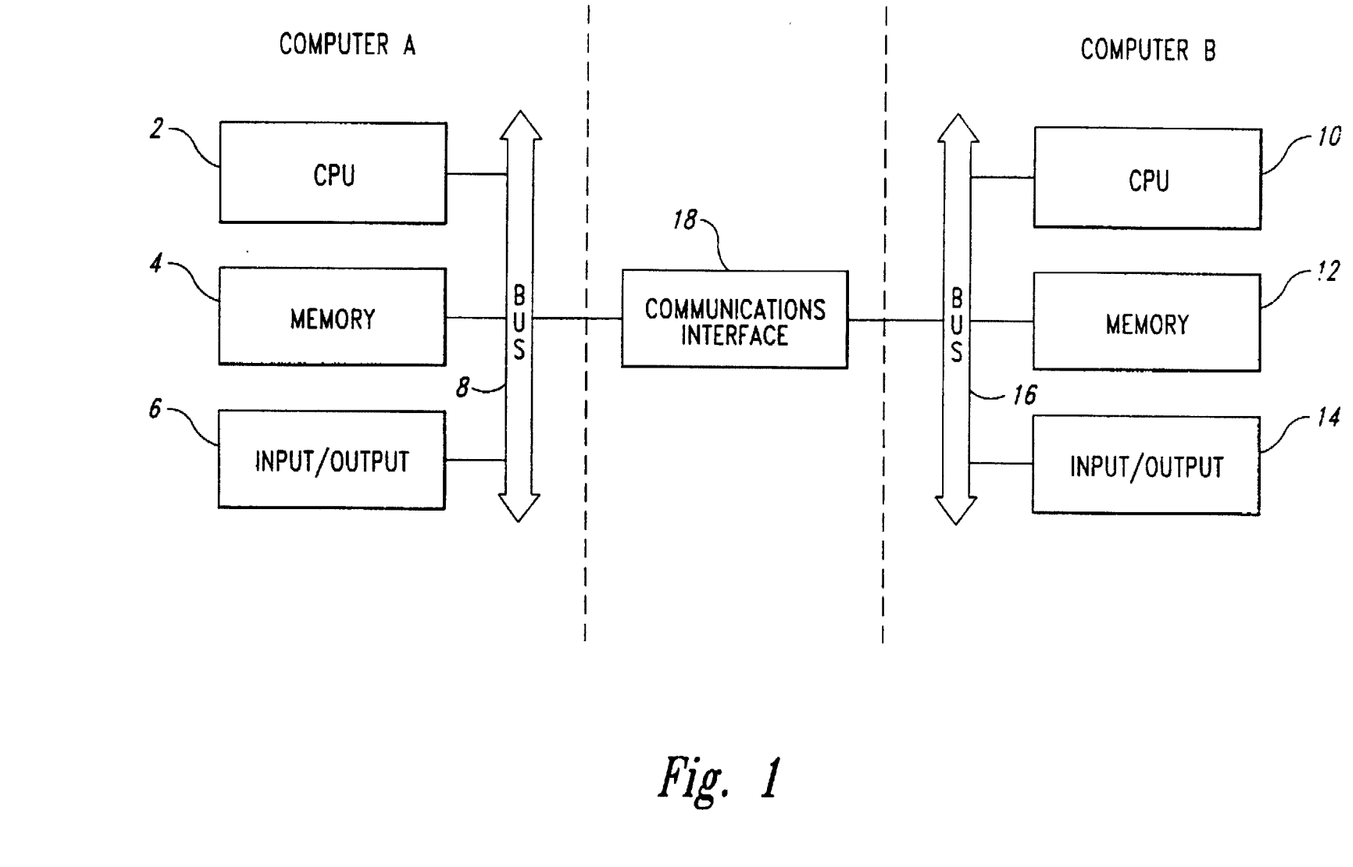
FIG. 1 is a block diagram of the preferred embodiment of the invention.

The preferred embodiment of the invention is illustrated in FIG. 1. Computer A comprises a CPU 2, memory devices 4, input/output devices 6, and a bus 8 comprising address, data, and control busses. Computer B comprises a CPU 10, memory devices 12, input/output devices 14, and a bus 16 comprising address, data, and control busses. Computer A and Computer B are separate computers, with separate address, data and control busses. Computer A and Computer B communicate through a communications interface 18.

In the preferred embodiment, Computer A is a personal computer or similar microcomputer. The bus 8 of Computer A is the Industry Standard Architecture ISA bus. The signals and timing of the ISA bus are well known to computer design engineers. The memory devices 4 of computer A include a ROM (not shown) which provides initial instructions for Computer A. Computer A may also include a hard disk drive (not shown) or similar mass storage device for low cost storage of files.

In the preferred embodiment, Computer B is a microcomputer which is assembled on a single printed circuit board. The printed circuit board is placed in an expansion slot in Computer A. Computer B is dedicated to time-critical tasks such as analog signal input and real-time processing of data derived from analog signals.

In the preferred embodiment, Computer B and the communications interface 18 between Computer A and Computer B are located on the same printed circuit board. The communications interface 18 preferably includes a FIFO buffer and associated control and buffer circuits. The communications interface 18 is connected to the bus 8 of Computer A through the I/O Channel of the ISA bus 8. The I/O Channel of the ISA bus is described in the Technical Reference Manual for the IBM Personal Computer AT, and is familiar to computer design engineers.

FIGS. 2–6 show schematics of the preferred embodiment of the invention. In FIGS. 2–6, an active low signal is denoted by a line placed above the signal name. In the text, and in the equations for programmable logic devices, an active low signal is denoted by placing the character "/" before the signal name.

Figure 2A:
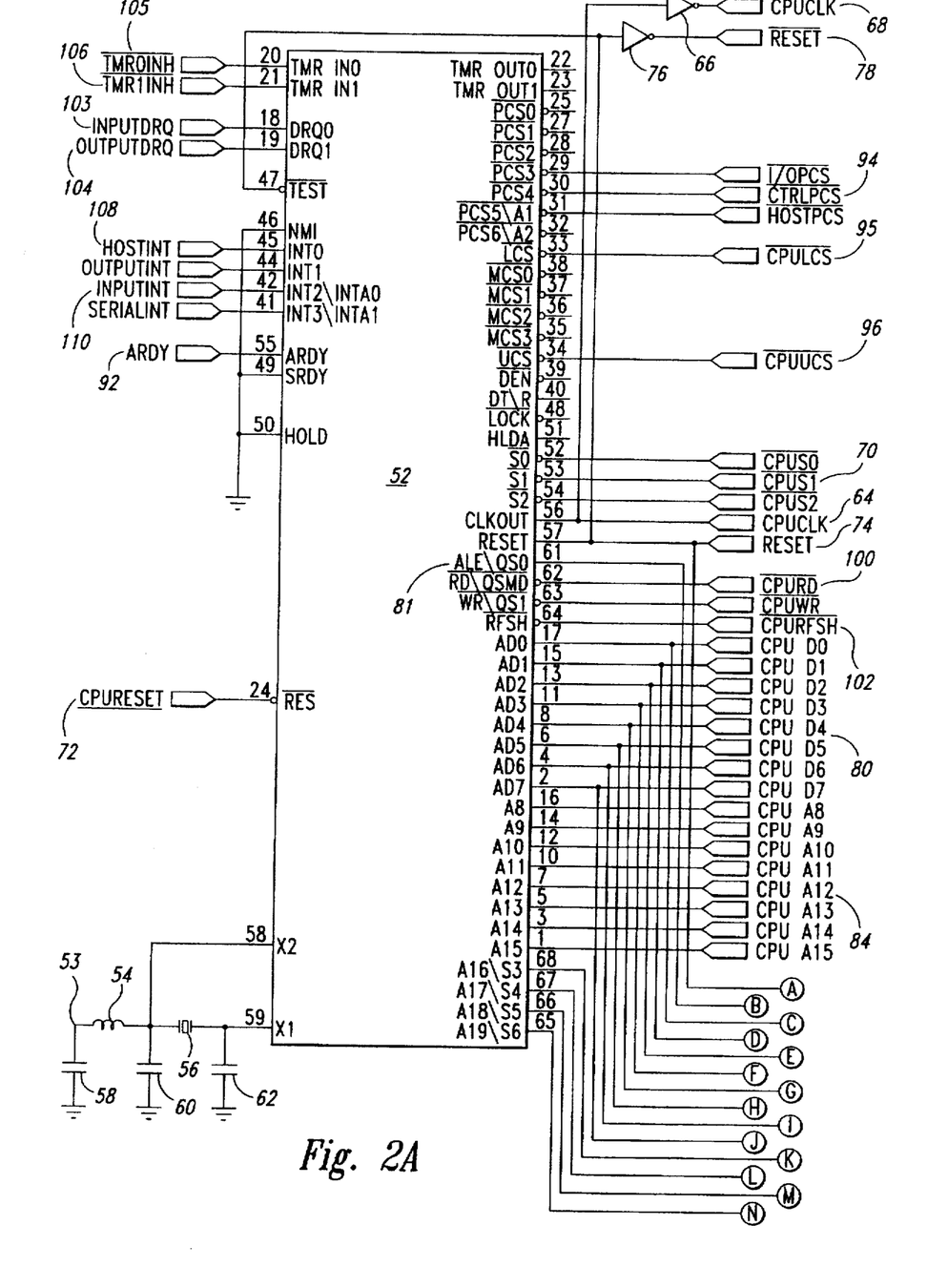
FIG. 2 is a schematic of a microprocessor and associated address latches circuitry used in Computer B.
Figure 2B:
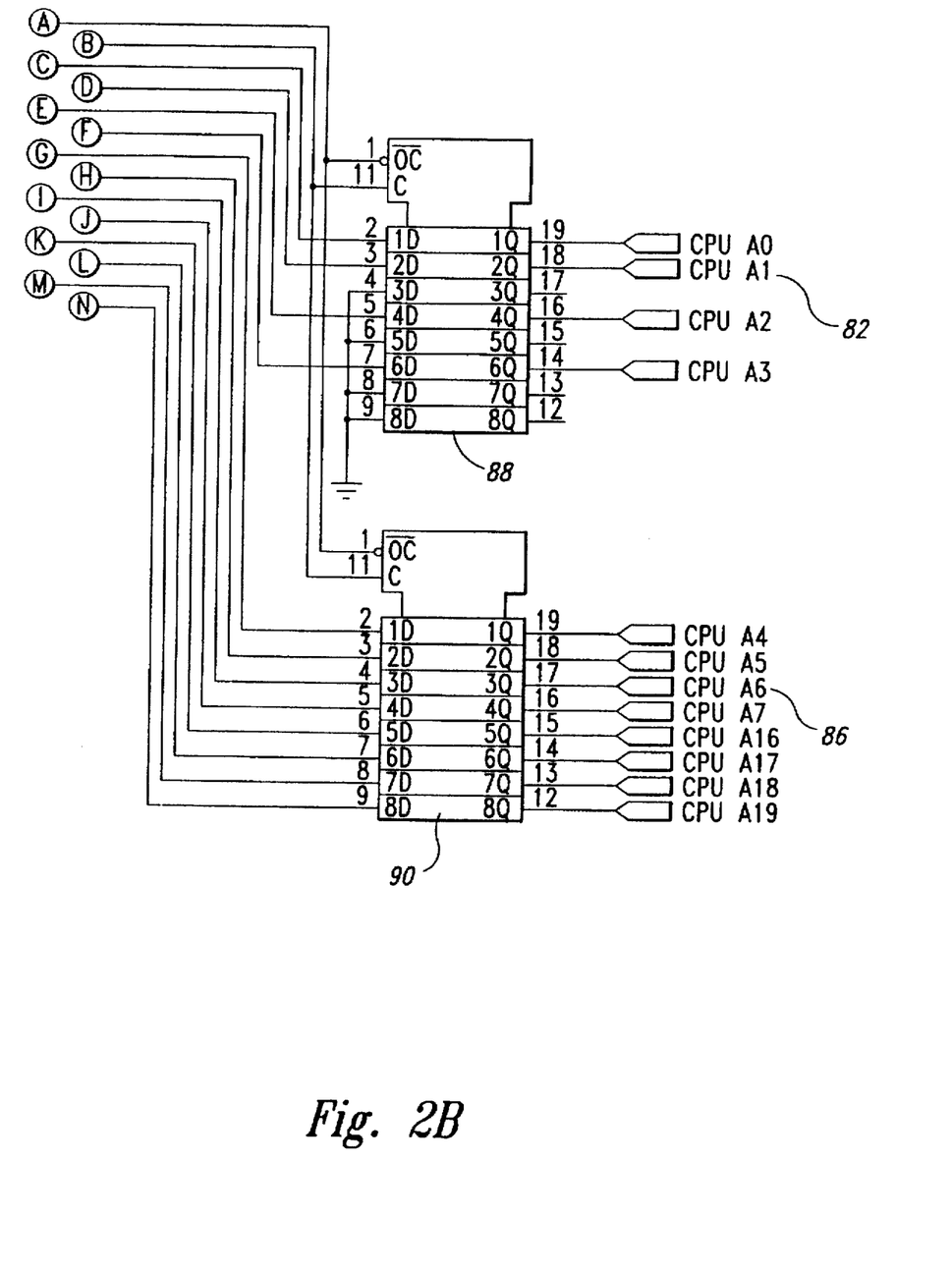

The integrated circuit shown in FIG. 2 is an integrated microprocessor 52, such as an Intel 80C188. The Intel 80C188 is in the family of microprocessors derived from the Intel 8088 and Intel 8086. This family of microprocessors includes the microprocessors in all IBM PC compatible computers, and is well known to computer design engineers. Microprocessor 52 is the CPU of Computer B.

A clock generation circuit 53 for microprocessor 52 comprises inductor 54, crystal 56, and capacitors 58, 60, and 62. The clock signal from the clock generation circuit 53 is used as the internal clock of microprocessor 52. The clock signal from the clock generation circuit 53 is internally divided and buffered by microprocessor 52 to form the system clock "CPUCLK" 64 for Computer B. CPUCLK 64 is a square wave whose frequency is half the frequency of the clock generation circuit 53. The signal CPUCLK 64 is inverted by inverter 66 to form the inverted clock "/CPUCLK" 68. Timing for input and output signals of microprocessor 52 is specified relative to the rising and falling edges of CPUCLK 64.

Eight types of bus cycles are defined for microprocessor 52. Each bus cycle of microprocessor 52 comprises a specified number of clock cycles of CPUCLK 64, possibly extended by WAIT cycles. Each clock cycle begins on a falling edge of CPUCLK 64 and ends on the following falling edge of CPUCLK 64. The clock cycles are denoted by T1, T2, T3, T4. WAIT cycles, denoted by TW, are clock cycles which are added to allow microprocessor 52 to read from and write to slow devices.

The signals "/CPU S0, /CPU S1, /CPU S2" 70 are the status outputs "/S0, /S1, S2" of microprocessor 52. These specify the type of a bus cycle. The following chart shows the status signals for the eight types of bus cycle defined for microprocessor 52:

| /S2 | /S1 | /S0 | Bus cycle |
|---|---|---|---|
| 0 | 0 | 0 | interrupt acknowledge |
| 0 | 0 | 1 | read input/output |
| 0 | 1 | 0 | write input/output |
| 0 | 1 | 1 | halt |
| 1 | 0 | 0 | instruction fetch |
| 1 | 0 | 1 | read data from memory |
| 1 | 1 | 0 | write data to memory |
| 1 | 1 | 1 | passive no bus cycle |

Halt and passive bus cycles have /S0=1 and /S1=1, and active bus cycles have either /S0=0 or /S1=0. In all cases, /S1=0 for a read cycle and S1=1 for a write cycle, and /S2=0 for an input/output cycle and /S2=1 for a memory cycle. The status outputs are valid from the last clock cycle of the bus cycle preceding the bus cycle for which they provide information, and always are inactive during the last clock cycle of the bus cycle.

The signal "/CPURESET" 72 is the external reset input of microprocessor 52. When /CPURESET 72 is active for a specified period of time, microprocessor 52 is brought to a known initial state. When CPURESET 72 subsequently becomes inactive, microprocessor 52 begns its operation by fetching an instruction from memory, starting at address "0FFFF0H", and executing that instruction. To fetch the instruction from memory address 0FFFF0H, microprocessor 52 places the address 0FFFF0H on the address bus, places control signals appropriate for a memory read cycle on the control bus, and then reads data from the data bus. If the instruction is more than one byte long, microprocessor 52 then places the next address 0FFFF1H on the address bus, places control signals appropriate for a memory read cycle on the control bus, and then reads data from the data bus. When microprocessor 52 has read sufficient data to assemble an entire instruction, microprocessor 52 executes the instruction it has fetched. Subsequent actions of microprocessor 52 depend upon the instructions and data inputs of microprocessor 52, and upon the control inputs of microprocessor 52. The ways in which a microprocessor responds to instructions and data are well known to computer design engineers.

/CPURESET 72 is buffered by microprocessor 52, internally synchronized to the clock of microprocessor 52, and output by microprocessor 52 as the signal "RESET" 74. Inverter 76 inverts RESET 74 to produce the active low reset signal "/RESET" 78 for devices which require active low reset signals. The active high and active low reset signals RESET 74 and /RESET 78 are inputs to various components of Computer B.

Figure 6A:
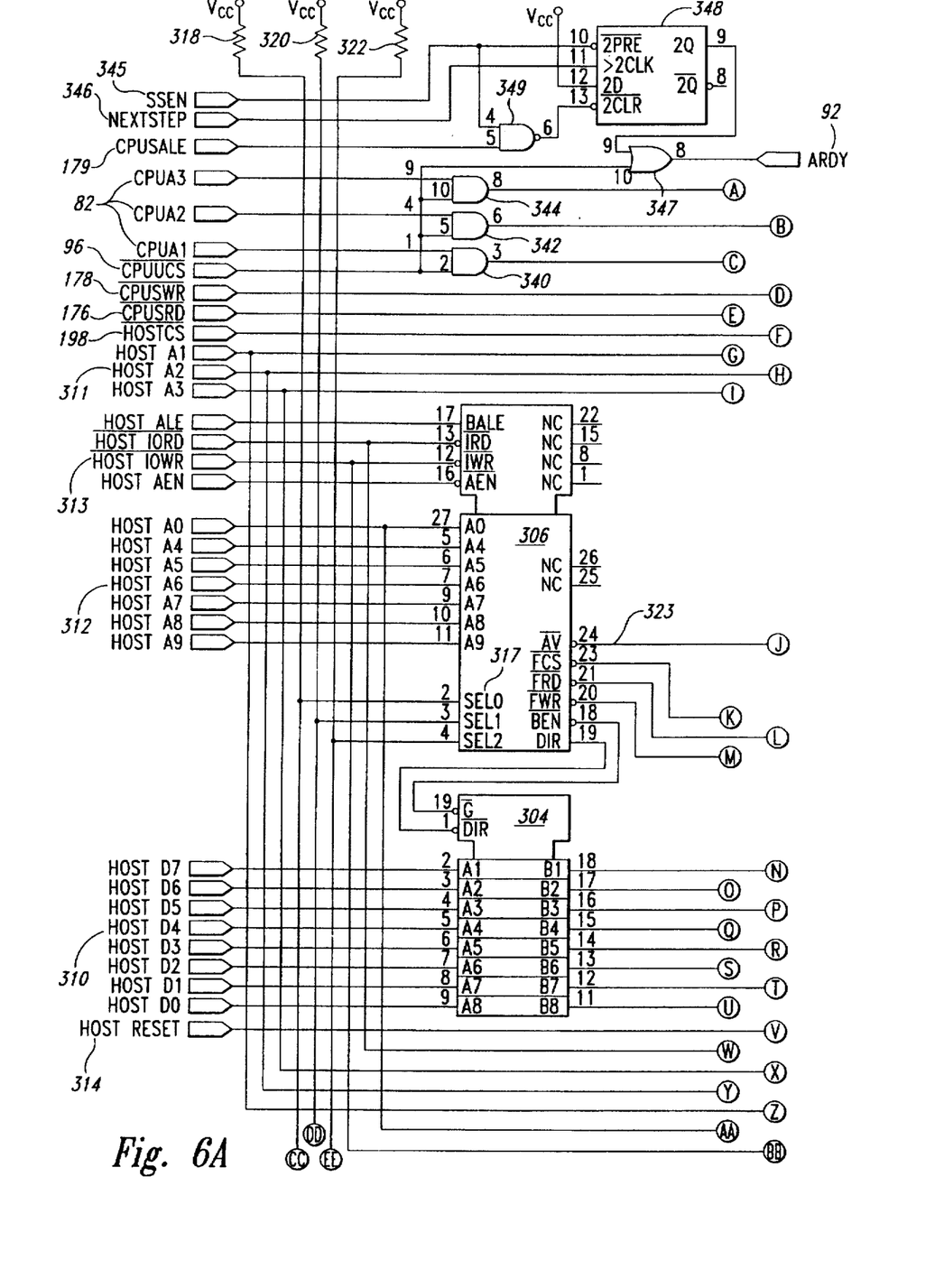
FIG. 6 is a schematic of one embodiment of a communications interface for allowing communications between Computer A and Computer B.
Figure 6B:
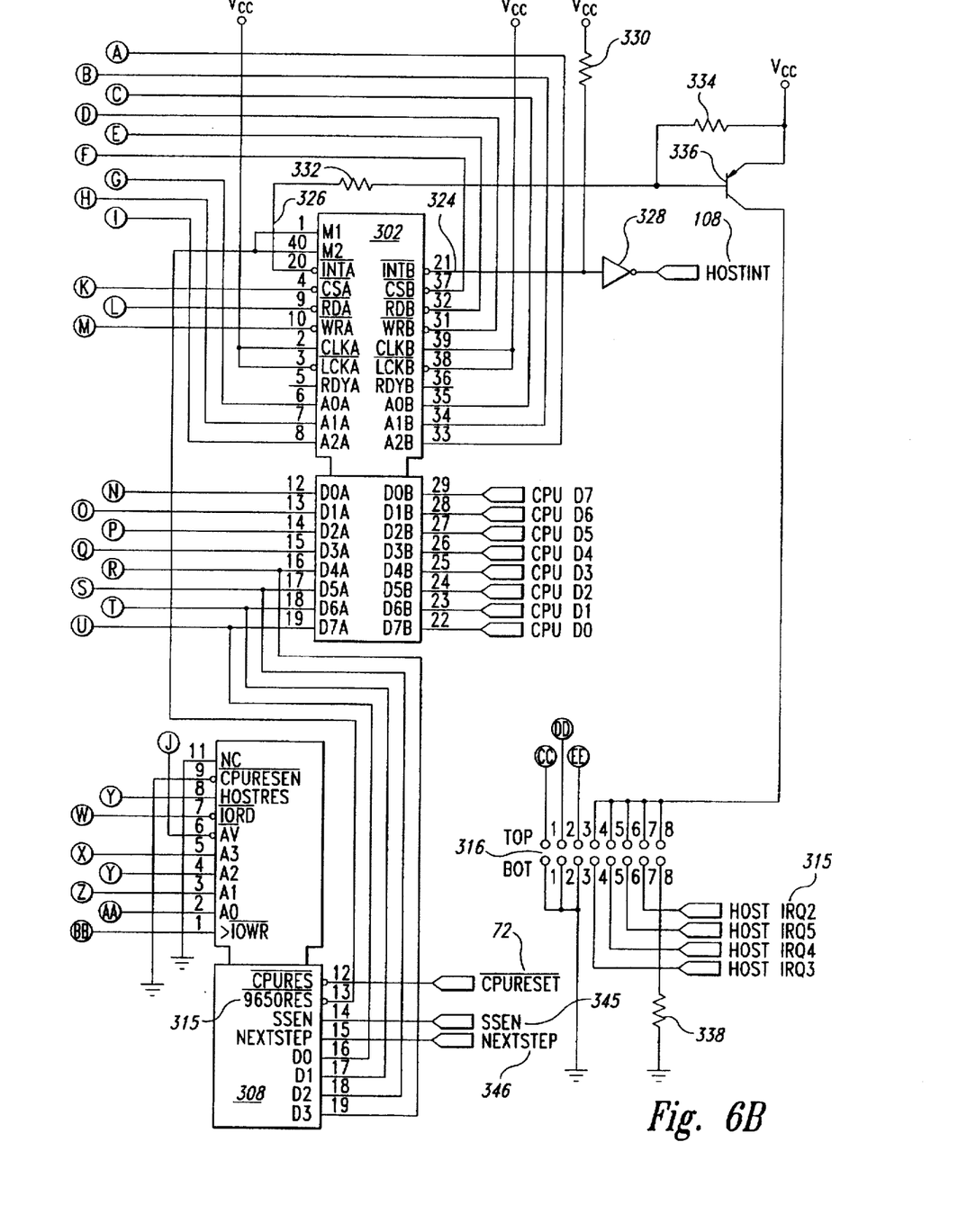

In the preferred embodiment of the invention, input /CPURESET 72 of microprocessor 52 is controlled by Computer B through the communications interface, as shown in FIG. 6 and described below.

The signals "CPU D0, . . . , CPU D7" 80 comprise the data bus of Computer B.

In the preferred embodiment of the invention, the signal ALE\QS0 81 functions as the address latch enable signal ALE 81. ALE 81 is an output of microprocessor 52. ALE 81 is active for a specified period of time beginning at the end of the clock cycle before each memory or input/output bus cycle of microprocessor 52.

The signals "CPU A0, . . . , CPU A19" "82, 84, 86" comprise the address bus of Computer B. Address bus signals "CPU A8, . . . , CPU A15" are latched internally by microprocessor 52 and do not require latches or buffers. Address latches 88 and 90 are controlled by ALE 81. Address bus signals "CPU A0, . . . , CPU A7" and "CPU A16, . . . , CPU A19" are latched and buffered by the address latches 88 and 90. The inputs of the address latches 88 and 90 are multiplexed outputs of microprocessor 52 which carry address outputs multiplexed with either data or status outputs. The address latch enable signal ALE 81 is connected to the latch enable inputs of the address latches 88 and 90. The timing of ALE 81 guarantees that the address outputs are latched when ALE 81 becomes inactive.

Input ARDY 92 is an asynchronous ready input to microprocessor 52. ARDY 92 is used by a device other than microprocessor 52 to insert one or more WAIT clock cycles into a bus cycle of microprocessor 52. Microprocessor 52 samples ARDY 92 at a specified time in each bus cycle. Each time ARDY 92 is sampled and found to be inactive in a bus cycle, microprocessor 52 inserts a WAIT clock cycle, extending the bus cycle by one clock cycle. ARDY 92 is sampled periodically until it is found to be active. Microprocessor 52 then continues instruction execution.

In one version of the preferred embodiment of the invention, the ARDY 92 input of microprocessor 52 is controlled by Computer A through the communications interface 18 (FIG. 1), enabling Computer A to place Computer B in a single step mode. The details of the single step mode are described below.

Microprocessor 52 includes an integrated programmable address decoding circuit, with address decode outputs "/I/OPCS", "/CTRLPCS", and "/HOSTPCS" 94, "/CPULCS" 95, and "/CPUUCS" 96. The address decode outputs 94–96 become active when microprocessor 52 reads from or writes to specified regions in its memory or input/output address space. The timing of the address decode outputs 94–96 and the programming required to define the specified regions for the address decode outputs 94–96 are described in the published specifications for the 80C188 integrated circuit.

/CPUUCS 96 is a programmable chip select output for upper memory. After microprocessor 52 is reset, the programming of /CPUUCS 96 defaults to a known state in which /CPUUCS 96 is active whenever microprocessor 52 reads from or writes to the highest 1K byte block of the memory address space. This block is specified by memory addresses from 0FFC00H to 0FFFFFH. The initial instructions for microprocessor 52 are fetched from memory locations starting at location 0FFFF0H.

Location 0FFFF0H and the following 15 locations lie in the highest 1K byte block of the memory address space. With the default programming for /CPUUCS 96 which is effective when microprocessor 52 is reset, /CPUUCS 96 is active when microprocessor 52 is fetching its instructions from location 0FFFF0H and the following 15 locations, so /CPUUCS 96 is active when microprocessor 52 is fetching its initial instructions.

There are only 16 bytes between the address location 0FFFF0H from which microprocessor 52 begins fetching its initial instructions to the top 0FFFFFH of the block of memory in which /CPUUCS 96 is active. In order to cause microprocessor 52 to continue fetching instructions from the block of memory in which /CPUUCS 96 is active, the program which Computer B runs in the preferred embodiment of the invention includes a jump to the start 0FFC00H of the region in which /CPUUCS 96 is active.

In the preferred embodiment of the invention, /HOSTPCS 94 selects the communications interface as an I/O mapped device in Computer B. This use of /HOSTPCS 94 is described below.

The read and write signals "/CPURD" 99 and "/CPUWR" 100 are active during specified times during read and write bus cycles, respectively, and the refresh signal "/CPURFSH" 102 is active during memory refresh cycles initiated by microprocessor 52.

The direct memory access signals "INPUTDRQ" 103, "OUTPUTDRQ" 104 and the timer inhibit signals "/TMR0INH" 105, "/TMR1INH" 106 are not directly involved in the preferred embodiment of the invention.

"HOSTINT" 108 is the interrupt input to microprocessor 52 from the communications interface. "OUTPUTINT", "INPUTINT", and "SERIALINT" 110 are interrupt inputs which are not directly involved in the preferred embodiment of the invention.

Figure 3:
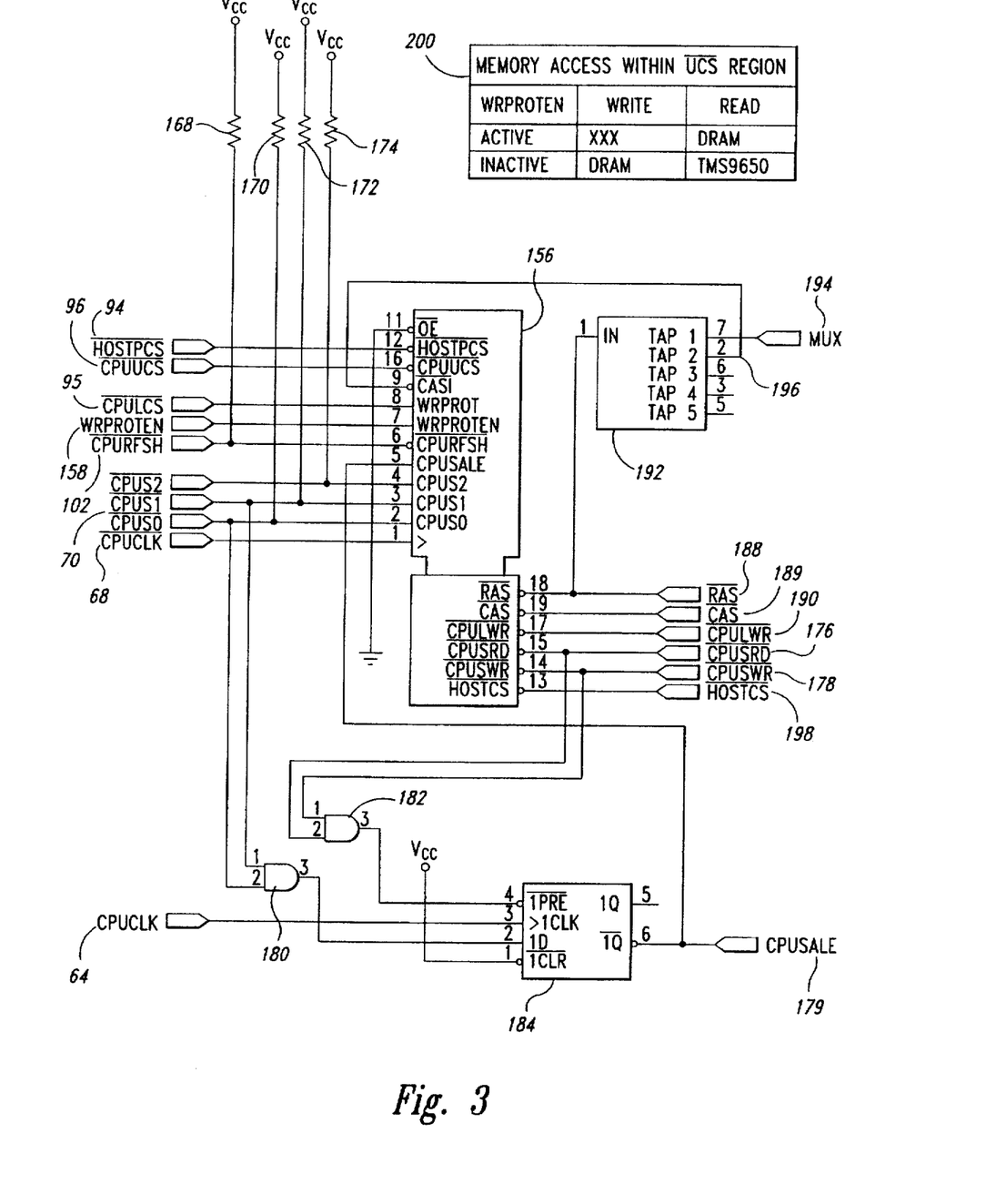
FIG. 3 is a schematic of circuitry for generating control and timing signals for Computer B.

FIG. 3 shows circuits which generate control and timing signals for Computer B. The clock signals CPUCLK 64 152 and /CPUCLK 68 154 synchronize the control and timing signals with the external clock of microprocessor 52.

Integrated circuit 156 is a programmable logic device ("PLD"), specifically an AMD type PALCE16V8. WRPROTEN 158 is an input signal to PLD 156 which is a latched write protect enable signal. This signal is generated by Computer B, as described below. The other inputs of PLD 156 are the status signals /CPUS0, /CPUS1, and /CPUS2 70, the address decode outputs /CPULCS 95, /CPUUCS 96, and /HOSTPCS 94 from microprocessor 52, and the refresh control output /CPURFSH 102 from microprocessor 52. The clock input /CPUCLK 68 of PLD 156 is the inverted clock output of microprocessor 52. PLD 156 is rising edge triggered, so the outputs of PLD 156 change on the rising edge of /CPUCLK 68. The rising edge of /CPUCLK 68 occurs at the falling edge of CPUCLK 64, which occurs at the start of each clock cycle of microprocessor 52.

Resistors 168, 170, 172, and 174 are pullup resistors which drive the signals "/CPURFSH, /CPUS0, /CPUS1", and /CPUS2 to high logic levels when the CPU microprocessor 52 floats these signals.

The synchronized read output "/CPUSRD" 176 of PLD 156, the synchronized write output "/CPUSWR" 178 of PLD 156, and the synchronized address latch enable "CPUSALE" 179 are signals whose shapes and timing are similar to the shapes and timing of the read output CPURD 100, the write output /CPUWR 100, and the address latch enable output ALE 81 of microprocessor 52. /CPUSRD 176, /CPUSWR 178, and CPUSALE 179 are synchronized with high speed bipolar integrated circuits, as described immediately below, so their timing with respect to the clock CPUCLK 64 is more precise than the timing of /CPURD 100, /CPRWR 100 and ALE 81. This improves the speed of Computer B, but is not an essential part of the invention.

The equations defining /CPUSRD 176 and /CPUSWR 178 are:

/CPUSRD:=/CPUSALE*/CPUS1

/CPUSWR:=/CPUSALE*CPUS1*/CPUS0

The status signals /CPUS0 and /CPUS1 70 always are inactive at the start of T4, the last cycle of a bus cycle, so /CPUSRD 176 and /CPUSWR 178 always are inactive during T4. /CPUSRD 176 and /CPUSWR 178 are active low signals, so they take logical high values when they are inactive.

NAND-gate 180, AND-gate 182, and flip-flop 184 generate the synchronized address latch enable signal CPUSALE 179. Because /CPUSRD 176 and /CPUSWR 178 take logical high values during T4, it is seen from FIG. 3 that the preset signal of flip-flop 184 is inactive during the last clock of a bus cycle. During T4, /CPUS0 and /CPUS1 are at logical high levels, so the output of NAND-gate 180 is at a logical low level. Flip-flop 184 is clocked by CPUCLK 64, so the /Q output of flip-flop 184 rises on the rising edge of CPUCLK 64 in the middle of the clock cycle preceding the first cycle of an active bus cycle. At the start of T1 of an active bus cycle, either /CPUS0 or /CPUS1 becomes active, so the output of NAND-gate 180 becomes high and CPUSALE 179 becomes low. Then, at the start of T2, CPUSALE 179 is low and either /CPURD 100 or /CPRWR 100 becomes low, so the output of AND-gate 182 becomes low. The output of AND-gate 182 is connected to the preset input of flip-flop 184, so the low value at the output of AND-gate 182 keeps CPUSALE 179 low until the start of T4, when the status lines are high and /CPUSRD 176 and /CPUSWR 178 again become inactive.

The outputs /RAS 188 and /CAS 189 are row address strobe and column address strobe inputs to the dynamic random access memories. The output "/CPULWR" 190 is a late write input to the dynamic memories. As can be seen from the equation defining /CPULWR 190 below, /CPULWR 190 becomes active one clock cycle after /CPUSWR 178, during memory access cycles.

A 100 nanosecond delay line 192 has five outputs which follow the input with delays of 20, 40, 60, 80, and 100 nanoseconds. The 20 nanoseconds output of delay line 192 is the signal "MUX" 194. The output 196, which is delayed by 40 nanoseconds, is fed back into the PLD 156.

Various means of generating the control signals /RAS 188, /CAS 189, /CPULWR 190, and MUX 194 for dynamic random access memories are well known to computer design engineers. The details of the implementation using PLD 156 and delay line 192 do not form a significant part of the preferred embodiment of the invention. For completeness, the following equations disclose the details of the generation of /RAS 188 and /CAS 189:

```
STRING RAMACCESS"/CPUSALE * CPUS2"
STRING RAMWRITE"RAMACCESS * CPUS1 * /CPUS0"
; WRPROTEN IS ACTIVE HIGH
EQUATIONS
/RAS  := RAMACCCESS * /CPUS1 * CPUUCS              ; MEMORY READ OUTSIDE UCS
       + RAMACCESS * /CPUS1 * /CPUUCS * WRPROTEN   ; MEMORY READ INSIDE UCS
       + RAMWRITE * /WRPROTEN * CPUUCS             ; MEMORY WRITE OUTSIDE UCS
       + RAMWRITE * WRPROTEN * CPUUCS              ; MEMORY WRITE OUTSIDE UCS
         * /WRPROTEN
       + RAMWRITE * /WRPROTEN */CPUUCS             ; MEMORY WRITE INSIDE UCS
         * /WRPROTEN
/CPULWR  := /CPUSWR * CPUS1 * /CPUS0
/CAS     = /CASI * /RAS
         + /CPURFSH
```

The input WRPROTEN 158 of PLD 156 is connected to the signal /CPULCS 95 from the address decode circuit of microprocessor 52.

PLD 156 generates the signal /HOSTCS 198 with which Computer B selects the communications interface. The equation defining /HOSTCS 198 is:

```
/HOSTCS  :=  /CPUSALE * /CPUS2 * /HOSTPCS
           + /CPUUCS * /CPUSALE * CPUS2 * /CPUS1 * /WRPROTEN
```

/CPUUCS 96 is active low and WRPROTEN 158 is active high, so it is seen from the equation for /HOSTCS 198 that /HOSTCS 198 is active during a memory read cycle when /CPUUCS 96 is active and WRPROTEN 158 is inactive, and is active during an input/output cycle when /HOSTPCS 94 is active. Thus the communications interface is both I/O mapped and memory mapped when WRPROTEN 158 is inactive, and is only I/O mapped when WRPROTEN 158 is active.

The table 200 in FIG. 3 shows the devices which are selected when microprocessor 52 reads from or writes to the address region in which /UCS is active; selection depends on the state of WRPROTEN 158.

Figure 4:
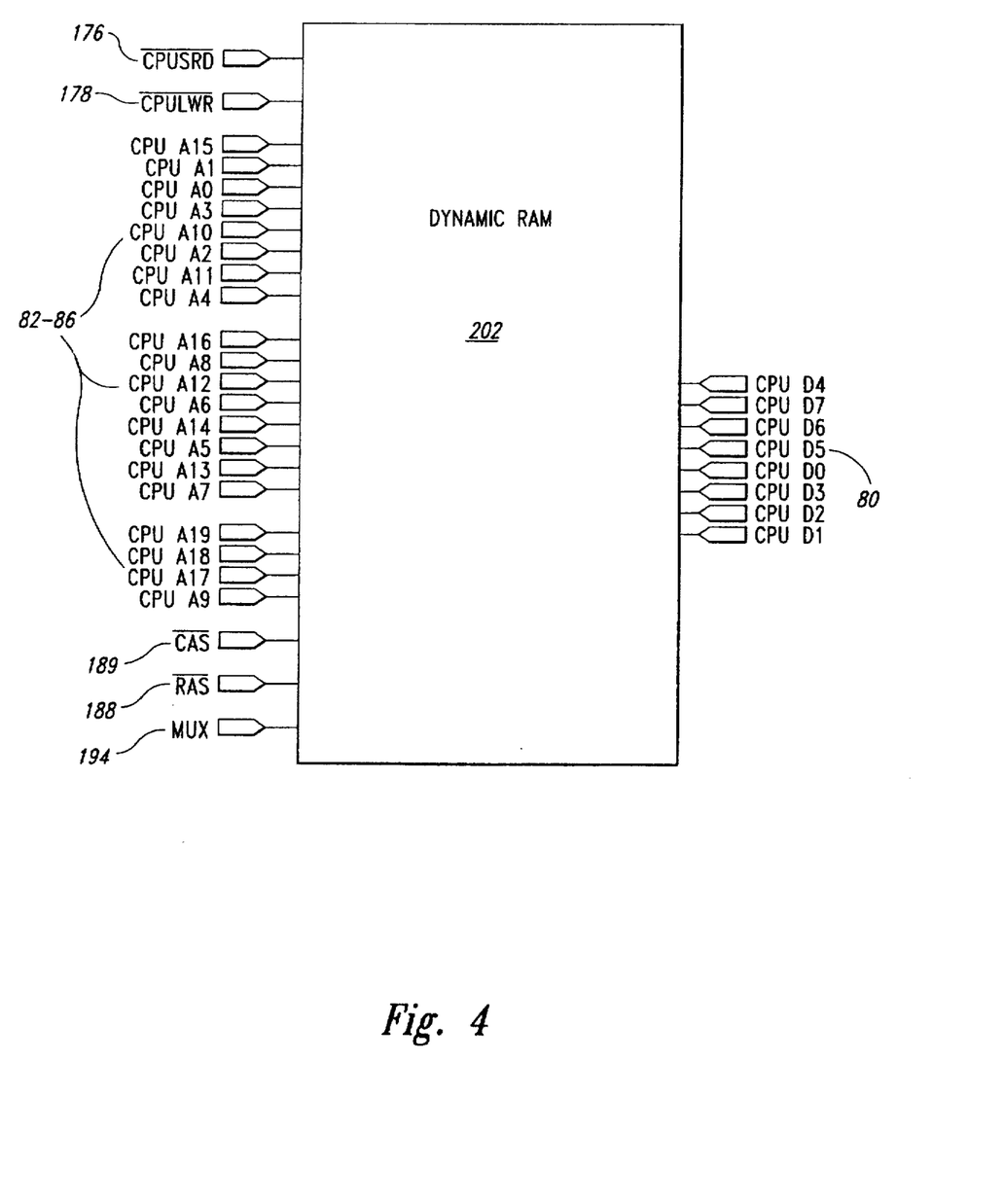
FIG. 4 is a block diagram of a dynamic random access memory integrated circuit used in Computer B.

FIG. 4 shows a block diagram of the dynamic random access memory 202 of Computer B. The dynamic random access memory of Computer B is connected to the data bus "D0, D1, ..., D7" 80, the address bus "A0, A1, ..., A19" 82–86, and the control signals /CPUSRD 176, /CPUSWR 178, /RAS 188, /CAS 189, and MUX 194. Designs for dynamic random access memories are well known to computer design engineers and are not directly involved in the invention.

In the preferred embodiment of the invention, analog and digital input/output circuits also are connected to the bus of Computer B. These are not shown in the Figures, as they are not directly involved in the invention.

Figure 5:
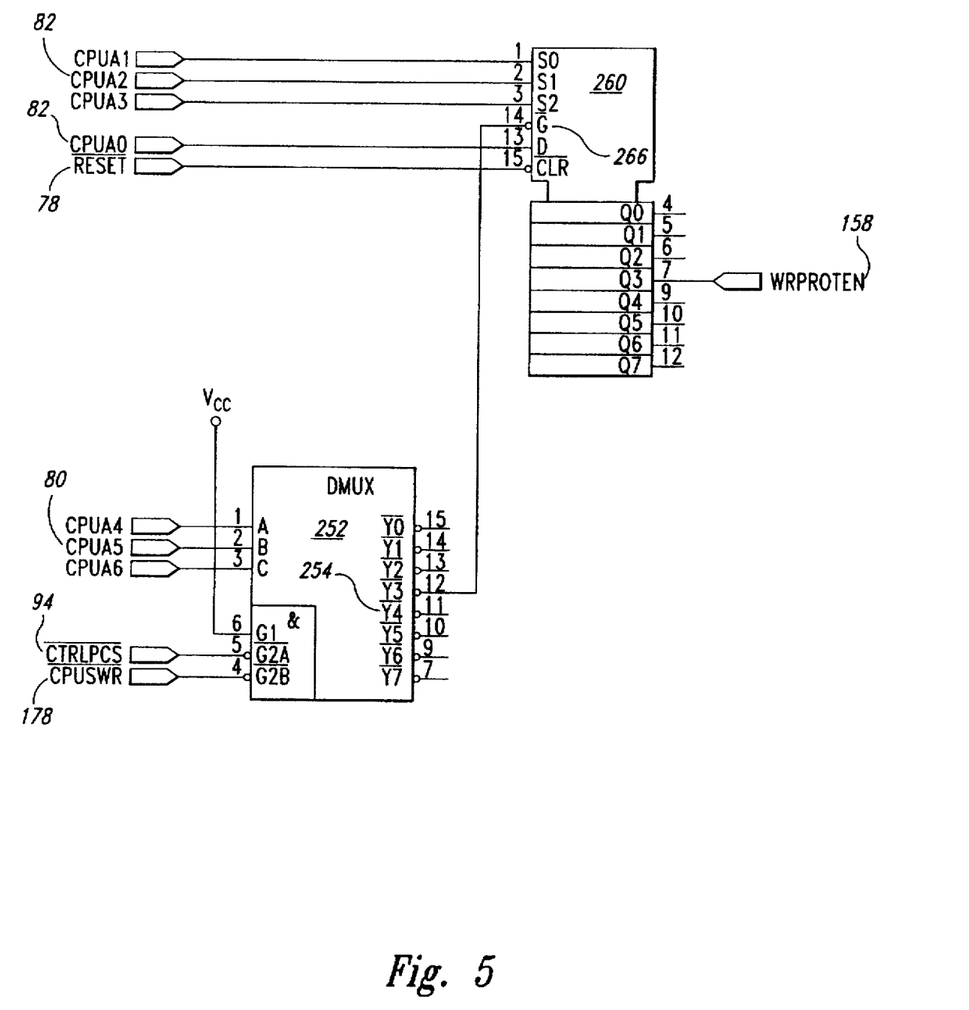
FIG. 5 is a schematic of circuitry for causing a specific block of random access memory of Computer B to be write protected under certain circumstances.

FIG. 5 shows a circuit for providing the WRPROTEN signal 158. A demultiplexer 252, such as a type 74AS138 or equivalent, has an output "/Y4" 254 that is low when control inputs /CTRLPCS 94 and /CPUSWR 178 are low, and when address inputs CPUA6, CPUA5, CPUA4 82 have the values "1,0,0." The input/output address range in which /CTRLPCS 94 is active is programmable. Means for programming this range are provided in the published specifications of the 80C188 microprocessor. Other outputs of demultiplexer 252 may be used for functions in Computer B which are not directly related to the preferred embodiment of the invention.

An addressable latch 260, which may be a type 74LS259 or equivalent, comprises eight one-bit latches. The address inputs CPUA1, CPUA2, CPUA3 82 select one of the eight latches. The address bit CPUA0 82 on the D input of addressable latch 260 is written to the selected latch when the gate input /G 266 is driven active and then inactive. The output WRPROTEN 158 is output from bit three of the addressable latch 260. Bit three is selected when address inputs CPUA3, CPUA2, CPUA1 82 have the values "0,1,1". The gate input /G 266 of the addressable latch 260 is connected to the /Y4 output 254 of demultiplexer 252, so addressable latch 260 is selected when /CTRLPCS 94 and /CPUSWR 178 are low, and when address inputs CPUA6, CPUA5, CPUA4 86 have the values "1,0,0" as described above. The D input of addressable latch 260 is connected to CPUA0 82, so the low order bit of the address bus of Computer B determines whether a 0 or a 1 is written to the selected latch when addressable latch 260 is selected. Software in Computer B sets the value of WRPROTEN 158 with an OUT instruction.

The /RESET signal 78 is the inverted reset signal from microprocessor 52. When Computer B is reset, /RESET 78 becomes active, thereby resetting addressable latch 260 and driving all outputs of addressable latch 260 low. This guarantees that WRPROTEN 158 is reset to its inactive state when Computer B is reset. From the description of the signal /HOSTCS 198 above, it is seen that the communications interface is both memory mapped and I/O mapped when Computer B is reset, and that the initial instructions for Computer B are fetched from the communications interface.

When WRPROTEN 158 is high, one block of RAM memory is write protected, converting that block to read-only-memory. Operating system programs and data can be placed in the protected block so that they cannot be overwritten accidentally.

FIG. 6 shows the communications interface between Computer A and Computer B in the preferred embodiment of the invention. Signals "HOST D0, ..., HOST D7" 310 are the data bus signals "D0, ..., D7" of Computer A. Signals "HOST A0, ..., HOST A9" 312 are address bus signals "A0, ..., A9" of Computer A.

A bidirectional FIFO buffer 302, such as part number TMS9650 sold by Texas Instruments, includes a bidirectional FIFO buffer, message registers, and status registers. A bidirectional bus buffer 304 provides current drive to allow the FIFO buffer 302 to drive the data bus 310 of Computer A. In the preferred implementation, no bus buffer is required for the data bus 80 of Computer B.

A programmable logic device ("PLD") 306, such as an AMD type PALCE20V8, produces signals with which Computer A controls the communications interface. PLD 306 decodes the address and control signals on the address bus 312 of Computer A to determine when Computer A is reading from or writing to the communications interface. PLD 306 also provides control signals for the FIFO buffer 302 and for the bus buffer 304.

Another programmable logic device ("PLD") 308, such as an ICT type PEEL18CV8, provides the /CPURESET signal 72 which allows Computer A to reset the microprocessor 52 of Computer B and the FIFO buffer 302 in the communications interface 18. PLD 308 also provides "SSEN" and "NEXTSTEP" signals 309 which allow Computer A to control single step execution in Computer B. PLD 308 also provides 8 addressable 4 bit words to the data bus 310 which can be read by Computer A. The 8 addressable words may be programmed to embed a serial number or other identifying information in the communications interface 18.

The communications interface 18 between Computer A and Computer B is I/O mapped in Computer A. It is standard practice on the ISA bus to decode only the low order bits of the address bus to select I/O mapped devices. The address bus signals HOST A0, ..., HOST A9 312 of Computer A are decoded to select the communications interface. The signals "HOST ALE", "/HOST IORD", "/HOST IOWR", "HOST AEN" 313, "HOST RESET" 314, and "HOST IRQ2", "HOST IRQ3", "HOST IRQ4", "HOST IRQ5" 315 are control bus signals of Computer A. These signals on the bus of Computer A are defined by the signals "ALE, /IORD, /IOWR, AEN, RESET, IRQ2, IRQ3, IRQ4, IRQ5" of the ISA bus, and are well known in the prior art. For simplicity in displaying the defining equations for programmable logic devices in the preferred embodiment of the invention, the prefix HOST is omitted from the names of signals identified in this paragraph.

Signals HOSTINT 108, ARDY 92, CPUSALE 179, CPU A1, CPU A2, CPU A3 82, /CPUSWR 178, /CPUSRD 176, and /HOSTCS 198 are connected to Computer B.

Jumper block 316 comprises eight pin pairs. A conductive jumper either is placed or is not placed across each pin pair, closing a circuit or leaving an open circuit. Pin pairs 1—1, 2—2, and 3—3 set three bits of the address of the communications interface in Computer A, through the operation of PLD 306, as described below. One side of each of pin pairs 1—1, 2—2, and 3—3 is connected to ground. The other sides of pin pairs 1—1, 2—2, and 3—3 are connected to select inputs SEL0, SEL1, and SEL2 317 of PLD 306, and are pulled up to logic high levels by resistors 318, 320, and 322. The use of the select inputs SEL0, SEL1, and SEL2 is described in detail below.

Three selection bits are provided by the setting inputs "SEL0", "SEL1", and "SEL2" of PLD 306 either low or high. If a jumper is omitted from the pin pair connected to an input, a pullup resistor pulls the input high. Three selection bits allow eight possible choices of the starting address of the communications interface in the input/output address space of Computer A. Of the eight possible addresses, seven are decoded to give the address valid signal AV 323 to PLD 308; the eighth possible address is not valid. The defining equations for PLD 306, with "HOST" omitted from each of the addresses "A4, . . . , A9" and AEN, follow:

/AV =

/SEL2 * /SEL1 * /SEL0 * A9 * /A8 * /A7 * /A6 * A5 * /A4 * /AEN +
/SEL2 * /SEL1 * SEL0 * A9 * /A8 * /A7 * /A6 * A5 * A4 * /AEN +
/SEL2 * SEL1 * /SEL0 * A9 * /A8 * /A7 * A6 * /A5 * /A4 * /AEN +
/SEL2 * SEL1 * SEL0 * A9 * /A8 * /A7 * A6 * /A5 * A4 * /AEN +
SEL2 * /SEL1 * /SEL0 * A9 * A8 * /A7 * /A6 * A5 * /A4 * /AEN +
SEL2 * /SEL1 * SEL0 * A9 * A8 * /A7 * /A6 * A5 * A4 * /AEN +
SEL2 * SEL1 * /SEL0 * A9 * A8 * /A7 * A6 * /A5 * /A4 * /AEN

The factor /AEN in each term of /AV qualifies /AV so that it is active only when the address on the ISA bus of Computer A is a non-DMA address, so /AV is active only when the address on the ISA bus of Computer A is a non-DMA address.

It is seen from the equation defining the address valid signal AV that /AV depends on address bits "A9, A8, A7, A6, A5, A4", and does not depend on address bits "A3, A2, A1, A0". /AV is active only when the following conditions are satisfied:

A9=1
A8=SEL2
A7=0
A6=SEL1
A5=/A6
A4=SEL0

It follows that the possible addresses of the communications interface in Computer A are at blocks of 16 addresses starting at 0220H, 0230H, 0240H, 0250H, 0320H, 0330H, and 0340H.

Pin pairs 4—5, 5—5, 6—6, and 7—7 of jumper block 316 select the interrupt line in Computer A used by the communications interface. Each of pin pairs 4—5, 5—5, 6—6, and 7—7 has one side connected to one of the interrupt lines HOST IRQ2, HOST IRQ3, HOST IRQ4 or HOST IRQ5 315. A jumper is placed on exactly one of the pin pairs 4—5, 5—5, 6—6, and 7—7 to connect the communications interface to one of the interrupt lines of Computer A.

FIFO buffer 302 provides an active low interrupt signal "/INTB" 324 for Computer B, and an active low interrupt signal "/INTA" 326 for Computer A: Inverter 328 provides an active high interrupt signal "HOSTINT" 108, as required by microprocessor 52. Pull-up resistor 330 drives the interrupt HOSTINT 108 to the inactive state when FIFO buffer 302 is reset.

The ISA bus requires an active high interrupt signal. To allow for the possibility that several boards may share an interrupt line on the ISA bus of one personal computer, the preferred embodiment of the invention has an open collector inverter driving the interrupt line. The open collector inverters on the several boards can be connected in a "wired-OR" configuration by placing a jumper on the pin pair 8—8 on just one of the boards. The active low interrupt signal /INTA 326 is inverted by the open collector inverter circuit comprising resistors 332, and 334 and transistor 336. Resistor 338 is a pull-down resistor which is connected to the open collector inverter through pin pair 8—8 of jumper block 316. The pins of pin pair 8—8 are connected on exactly one board using the interrupt line used by the communications interface, so resistor 338 provides a logic low level for the open collector output.

The address inputs to FIFO buffer 302 are inputs to AND-gates 340, 342, 344, with /CPUUCS 96 as the second input to each AND-gate 340, 342, 344. Because /CPUUCS 96 is active when FIFO buffer 302 is addressed as a memory mapped device, this forces the address inputs low, independent of the low order address bits on the address bus of Computer A. The internal FIFO buffer of FIFO buffer 302 is accessed by setting all of the address bits low, and other registers in FIFO buffer 302 are addressed by setting some of the address bits high. Setting all the address inputs to FIFO buffer 302 when the communications interface is addressed as a memory mapped device causes Computer B to read its initial instructions only from the FIFO buffer, not from any of the other registers in FIFO buffer 302.

The signals /FCS, /FRD, and /FWR generated by PLD 306 from the address bits 312 of Computer A are chip select, read, and write signals for FIFO buffer 302. The signals /DIR and /BEN, also generated by PLD 306 from the address bits 312 of Computer A, are the direction and buffer enable signals to bidirectional bus buffer 304. The defining equations for these signals are:

/FCS = /IORD * /AV * /AEN * /A0 +
       /IOWR * /AV * /AEN * /A0

/FRD = /IORD * /FCS * /AV * /AEN

/FWR = /IOWR * /FCS * /AV * /AEN

/DIR = /IORD +
       /DIR * /BALE

/BEN = /IORD * /AV * /AEN +
       /IOWR * /AV * /AEN

As mentioned above, PLD 308 provides the signals which allow Computer A to reset the CPU microprocessor 52 of Computer B and the FIFO buffer 302 in the communications interface. PLD 308 also provides control signals SSEN and NEXTSTEP which, through OR-gate and flip-flop 184, allow Computer A to control single step execution in Computer B. Single step execution is controlled through the asynchronous ready ARDY 92 input to the microprocessor 52. PLD 308 also provides 8 addressable 4 bit words which can be read by Computer A. The 8 addressable words may be programmed to embed a serial number or other identifying information in the communications interface. Defining equations for PLD 308 are given below:

```
ENABLE  /D0 = /AV * /A3 * /A2 * A0 * /IORD
ENABLE  /D1 = /AV * /A3 * /A2 * A0 * /IORD
ENABLE  /D2 = /AV * /A3 * /A2 * A0 * /IORD
ENABLE  /D3 = /AV * /A3 * /A2 * A0 * /IORD

AC = HOSTRES

CPURES    := /AV * /A3 * /A2 * /A1 * A0 * D0 * /HOSTRES +
             CPURES * AV * /HOSTRES +
             CPURES * A3 * /HOSTRES +
             CPURES * A2 * /HOSTRES +
             CPURES * A1 * /HOSTRES +
             CPURES * /A0 * /HOSTRES +
             CPURES * D0 * /HOSTRES

9650RESET := /AV * /A3 * /A2 * /A1 * A0 * D1 * /HOSTRES +
             9650RESET * AV * /HOSTRES +
             9650RESET * A3 * /HOSTRES +
             9650RESET * A2 * /HOSTRES +
             9650RESET * A1 * /HOSTRES +
             9650RESET * /A0 * /HOSTRES +
             9650RESET * D1 * /HOSTRES

SSEN      := /AV * /A3 * /A2 * /A1 * A0 * D2 * /HOSTRES +
             SSEN * AV * /HOSTRES +
             SSEN * A3 * /HOSTRES +
             SSEN * A2 * /HOSTRES +
             SSEN * A1 * /HOSTRES +
             SSEN * /A0 * /HOSTRES +
             SSEN * D2 * /HOSTRES

NEXTSTEP  := /AV * /A3 * /A2 * /A1 * A0 * D3 * /HOSTRES +
             NEXTSTEP * AV * /HOSTRES +
             NEXTSTEP * A3 * /HOSTRES +
             NEXTSTEP * A2 * /HOSTRES +
             NEXTSTEP * A1 * /HOSTRES +
             NEXTSTEP * /A0 * /HOSTRES +
             NEXTSTEP * D3 * /HOSTRES
```

/HOST IORD313 of Computer A is valid, and the address inputs "A3", "A2", "A0" 311–312 from Computer A take the values ("0,0,1").

The signals "NEXTSTEP", "SSEN", "9650RESET" and "CPURES" internal to PLD 308 are registered signals which are written when signal /IOWR 313 from Computer A is active.

Address bit A1 311 from Computer A is used to select between reading and writing the signals "NEXTSTEP", "SSEN", "9650RESET" and "CPURES" internal to PLD 308 and reading the serial number or other identifying information embedded in PLD 308. The controls are selected when A1 311 equals "0", and the serial number or other identifying information is selected when A1 311 is "1".

The equations for "CPURES", "9650RESET", "SSEN" and "NEXTSTEP" make these four outputs into registers which retain values which are written to them when Computer A writes to the communications interface with A3, A2, A1, A0="0,0,0,1".

Identifying data coded in PLD 308 may be read by Computer A while /CPURES is active. To read one four-bit word, Computer A first writes to PLD 308 to set one of eight possible patterns of the bits "NEXTSTEP", "SSEN", "9650RESET" and then reads from the communications interface with address bits "A3, A2, A1, A0"=0,0,1,1. Because /CPURES must be active in order to read the identifying data, the identifying data may be read without disturbing Computer A only before Computer A causes the reset signal of Computer B to become inactive.

The actual equations for D0, D1, D2, D3 depend on the identifying data. Typical equations follow:

```
/D0 = /IORD * /A3 * /A2 * /A1 * A0 * /CPURES +
      /IORD * /A3 * /A2 * A1 * A0 * /NEXTSTEP * /SSEN * /9650RESET * /CPURES

/D1 = /IORD * /A3 * /A2 * /A1 * A0 * /9650RESET +
      /IORD * /A3 * /A2 * A1 * A0 * /NEXTSTEP * /SSEN * /9650RESET * /CPURES

/D2 = /IORD * /A3 * /A2 * /A1 * A0 * /SSEN +
      /IORD * /A3 * /A2 * A1 * A0 * /NEXTSTEP * /SSEN * /9650RESET * /CPURES

/D3 = /IORD * /A3 * /A2 * /A1 * A0 * /NEXTSTEP +
      /IORD * /A3 * /A2 * A1 * A0 * /NEXTSTEP * /SSEN * /9650RESET * /CPURES
```

AC is an internal All Clear node which is connected to HOSTRES. HOSTRESS is connected to the reset signal "HOST RESET" 314 of Computer A. This forces a reset of PLD 308 when Computer A is reset, so that PLD 308 is in a known state. The outputs /CPURESET 72 and /9650RESET 315, in particular, are at logic low levels, so the microprocessor 52 and the FIFO buffer 302 both are reset when Computer A is reset.

It is seen from the equations for "ENABLE D3", "ENABLE D2", "ENABLE D1", "ENABLE D0" that the pins "D0", "D1", "D2", and "D3" of PLD 308 are bidirectional. These pins are inputs when the address valid signal /AV 323 from PLD 306 is active, the input/output read signal Many methods exist for embedding a serial number or other identifying information in the communications interface. The specific method of embedding a serial number or other identifying information in the communications interface is not an essential part of the invention.

A single step circuit in the communications interface controls single stepping in Computer B by means of the asynchronous ready input ARDY 92 to microprocessor 52. When ARDY 92 is low, microprocessor 52 inserts WAIT cycles; when ARDY 92 is high, microprocessor 52 continues with program execution without WAIT cycles. From this it follows that WAIT cycles are not inserted if either input to OR-gate 347 is high. Because one input of OR-gate 347 is /CPUUCS 96, it is seen that ARDY goes inactive only when /CPUUCS is active. With the default programming when microprocessor 52 is reset, it is seen that ARDY goes inactive only when microprocessor 52 is reading the FIFO buffer 302 in the communications interface.

If single step enable SSEN 309 is inactive, the preset input /PRE to flip-flop 348 is active, so the Q output of flip-flop 348 is high, and so ARDY is active. If single step enable SSEN 309 is active, the preset input /PRE to flip-flop 348 is inactive.

The clear input /CLR to flip-flop 348 is the output of NAND gate 349. The output of the NAND-gate is active when CPUSALE 179 is high and SSEN 309 is active. Because CPUSALE is high only at the start of a bus cycle and at the end of the preceding bus cycle, as described above, it follows that ARDY 92 becomes inactive at the start of each bus cycle in which microprocessor 52 reads from the FIFO buffer 302 while SSEN is active. ARDY 92 then becomes active when the clock input NEXTSTEP 309 of flip-flop 348 makes a transition from low to high. Because Computer A controls NEXTSTEP through PLD 308, Computer A causes ARDY 92 to become active, and so Computer A causes Computer B to read one byte from the communications interface each time Computer A toggles NEXTSTEP 348.

The preceding description of a single step circuit controlled by Computer A gives only one implementation for purposes of illustration. Many other circuits for implementing single step control are known in the prior art.

The circuits shown in FIGS. 2–6 allow Computer A to control the reset signal of Computer B, allow Computer A to write to and read from the FIFO buffer in the communications interface, cause the communications interface initially to be memory mapped in the block of memory from which Computer B reads its initial instructions, and cause the communications interface also to be I/O mapped in the input/output address space of Computer B.

The circuits shown in FIGS. 2–6 also allow Computer A to read identifying information about Computer B from the communications interface, and allow Computer A to control the single step circuitry in Computer B.

Computer B is equipped with address decoding circuits which enable it to fetch its initial instructions from the FIFO buffer in the communications interface.

The reset signal of Computer B is controlled by Computer A. At the time at which Computer A causes the reset signal of Computer B to become inactive, the address decoding circuits of Computer B are configured such that when Computer B fetches instructions from the memory locations from which the initial instructions are fetched, Computer B reads from the FIFO buffer in the communications interface.

A single step circuit or a circuit which causes Computer B to wait when instructions are not available in the communications interface optionally may be provided for Computer B; this circuit may be controlled by Computer A.

In the preferred embodiment of the invention, the address decoding circuit of Computer B always causes the FIFO buffer to be I/O mapped within the input/output address space of Computer B.

The address decoding circuit of Computer B may be designed so that a software command changes the address decoding in such a way that when Computer B attempts to fetch instructions from the block of memory in which the initial instructions are expected, Computer B does not read from the FIFO buffer in the communications interface but instead reads from a memory device or another input/output device.

Figure 7:
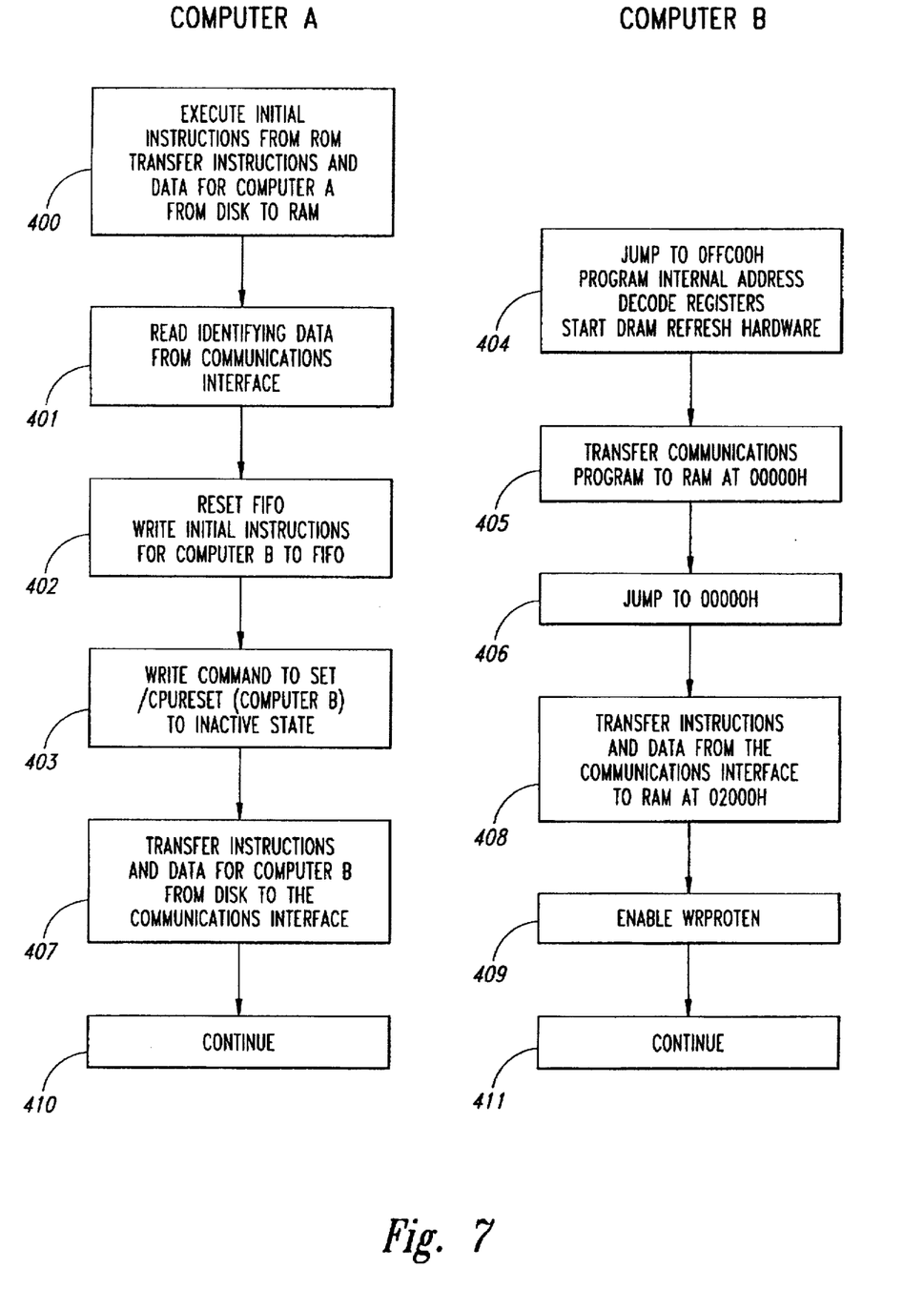
FIG. 7 is a flow chart showing the software executed in Computer A and the software executed in Computer B.

Upon reset the following actions occur, as shown in the software flow chart FIG. 7:

(1) Computer A receives a power-on reset signal. The CPU of Computer B receives a power-on reset signal CPURES and is kept in the reset state pending receipt of a reset-terminating signal from Computer A.

(2) Computer A fetches its initial instructions from ROM at step 400, and also transfers additional instructions from its hard disk to its RAM.

(3) Computer A reads identifying information for Computer B from the communications interface at 401.

(4) Computer A resets the FIFO buffer in the communications interface between Computer A and Computer B and then writes a sequence of up to 256 bytes into the FIFO buffer at 402. Computer A then causes the reset signal of Computer B to become inactive at 403.

(5) Computer B fetches its initial instructions from the FIFO buffer in the communications interface. The initial instructions cause Computer B to jump to location "0FFC00H" at 404. This location is within the region in which memory read operations cause the address decoding circuit to select the FIFO buffer. At 404, the initial instructions further cause Computer B to program the internal registers of microprocessor 52 to set up the internal address decode circuits of microprocessor 52. The initial instructions executed at 404 further cause Computer B to start the DRAM refresh control circuits internal to microprocessor 52.

Among the initial instructions which the microprocessor 52 of Computer B executes from the FIFO buffer in the communications interface is a string move instruction, executed at 405, which causes Computer B to read a specified number of bytes from the FIFO buffer and transfer the bytes to RAM in Computer B. If the CPU of Computer B has an instruction queue, the bytes read by Computer B also may include NOP (no operation) instructions which fill the instruction queue. While Computer B is executing the string move instruction, it is not attempting to fetch instructions, so there is no interference between instruction fetches and the string move operation.

(6) After completing the string move instruction, Computer B fetches from the FIFO buffer in the communications interface at 406 an instruction which causes a jump to the location in the RAM to which the string move instruction has transferred a specified number of bytes.

(7) After Computer B has read from the FIFO buffer in the communications interface, Computer A runs a communications program at 407 which reads instructions and data for Computer B from the hard disk of Computer A and transfers the instructions and data to the FIFO buffer in the communications interface. At the same time, Computer B runs a communications program at 408 which has been transferred to RAM by the string move during step 405. The communications program which is being run at 408 transfers instructions and data from the FIFO buffer in the communications interface to the RAM in Computer B. The programs in Computer A and Computer B maintain a communication protocol so that Computer A and Computer B alternate writing to the FIFO buffer and reading from the FIFO buffer, respectively.

(8) After the desired instructions and data are loaded into the RAM of Computer B, the memory locations to which the instructions and data have been written may optionally be write protected at step 409 by enabling WRPROTEN 158, so that part of the RAM is write protected.

(9) Computer A and Computer B then continue steps 410–411, performing the processing and input/output functions for which they have been designed.

In another preferred embodiment embodiment of the invention, the FIFO buffer in the communications interface is replaced by registers. In this embodiment, Computer A writes to the communications interface each time Computer B reads from the communications interface. After Computer A writes each byte into the communications interface, Computer A toggles the NEXTSTEP 309 signal so that Computer B is able to fetch the byte written by Computer A.

We claim:

1. A computer system, comprising:

a first computer;

a second computer having stored therein a plurality of initial instructions for said first computer communications interface means operatively connected to said first and second computers for allowing communication between said first and second computers;

transfer means for transferring said plurality of initial instructions from said second computer to said communications interface;

reset means controlled by said second computer for resetting said first computer; and decoding means operatively associated with said first computer for addressing said communications interface when said first computer outputs an address falling within the address space of said initial instructions whereby said first computer obtains its initial instructions from said second computer through said communications interface.

2. The computer system of claim 1, further comprising:

a random access memory;

means responsive to said first computer for transferring a plurality of instructions from said communications interface to said random access memory while said first computer is executing at least some of said initial instructions from said communications interface; and means for causing said first computer to execute instructions from said random access memory after said plurality of instructions have been written into said random access memory.

3. The computer system of claim 2 further including protection means for write protecting addresses in said random access memory where said plurality of instructions have been stored after said instructions have been written into said random access memory.

4. The computer system of claim 3, wherein said protection means is controlled by said first computer.

5. The computer system of claim 1, wherein said computer system further comprises:

means for determining when said initial instructions for said first computer are not available from said communications interface; and inhibit means for delaying execution of instructions in said first computer until said initial instructions for said first computer are available from said communications interface.

6. The computer system of claim 1 wherein said second computer further includes a data disk in which said initial instructions are stored.

7. The computer system of claim 1 wherein said communications interface comprises a FIFO buffer.

8. The computer system of claim 1 wherein said communications interface comprises a direct memory access controller.

9. The communications system of claim 1 wherein said communications interface comprises a data register.

10. The communications system of claim 1 wherein said communications interface further includes storage means for storing data uniquely identifying said first computer, said data being readable by said second computer.

11. The communications system of claim 10 wherein said storage means, first computer, and communications interface are mounted on a common circuit board, wherein said second computer is connected to said communications interface through a data bus for said second computer, and wherein said storage means outputs said identifying data onto the data bus of said second computer.

12. In a computer system having first and second computers and a communications interface allowing communication between said first and second computers, a method of providing initial instructions to said first computer, comprising:

storing said initial instructions for said first computer in said second computer;

writing said initial instructions from said second computer to said communications interface; and resetting said first computer from said second computer;

decoding the address from which said first computer fetches initial instructions to cause said communications interface to be addressed when said first computer outputs an address falling within the address space of said initial instructions whereby said first computer obtains its initial instructions from said second computer through said communications interface.

13. The method of claim 12 wherein said first computer further includes a random access memory, and wherein said initial instructions cause said first computer to transfer a plurality of instructions from said communications interface to said random access memory, and wherein said method further includes the step of executing instructions for said first computer by reading said plurality of instructions from said random access memory.

14. The method of claim 13 further including the step of write protecting addresses in said random access memory where said plurality of instructions have been stored after said instructions have been stored in said random access memory.

15. The method of claim 12 wherein said communications interface determines when said initial instructions for said first computer are not available from said communications interface, and wherein said method further includes the step of delaying execution of instructions in said first computer until said initial instructions are available from said communications interface.

16. The method of claim 12 wherein said initial instructions are stored in said second computer on a disk.

17. The method of claim 12 wherein said communications interface comprises a FIFO buffer.

18. The method of claim 12 wherein said communications interface comprises a direct memory access controller.

19. The method of claim 12 wherein said communications interface comprises a data register.

20. The method of claim 12 further including the step of storing data identifying said first computer, and selectively outputing said data to said second computer.

* * * * *